United States Patent
Galand et al.

(10) Patent No.: US 6,317,433 B1
(45) Date of Patent: Nov. 13, 2001

(54) METHOD AND SYSTEM FOR OPTIMIZING TRANSMISSION LINK BANDWIDTH OCCUPATION IN HIGH SPEED DIGITAL NETWORKS

(75) Inventors: Claude Galand, La Coole sur Loup; Laurent Nicolas, Villeneuve Loubet; Rene Glaise, Nice; Gerald Lebizay, Vence, all of (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/170,299

(22) Filed: Oct. 13, 1998

(30) Foreign Application Priority Data

Oct. 16, 1997 (EP) .................................................. 97480071

(51) Int. Cl.[7] ..................................................... H04J 3/24
(52) U.S. Cl. ............................ 370/395; 370/466; 370/474
(58) Field of Search .................................. 370/355, 357, 370/392, 395, 396, 397, 400, 474, 466, 521, 477, 401, 470, 471

(56) References Cited

U.S. PATENT DOCUMENTS

| | | | |
|---|---|---|---|
| 5,414,707 | * 5/1995 | Johnston et al ....................... | 370/395 |
| 5,459,722 | 10/1995 | Sherif .................................. | 370/60.1 |
| 5,570,355 | 10/1996 | Dail et al. ............................ | 370/60.1 |
| 5,883,893 | 3/1999 | Rumer et al. ......................... | 370/395 |
| 5,946,323 | 8/1999 | Eakins et al. ......................... | 370/468 |
| 5,999,529 | 12/1999 | Bernstein et al. .................... | 370/376 |
| 6,002,692 | * 12/1999 | Wills .................................... | 370/477 |
| 6,041,054 | * 3/2000 | Westberg ............................. | 370/477 |
| 6,052,379 | 4/2000 | Iverson et al. ....................... | 370/442 |
| 6,075,769 | 6/2000 | Ghanwani et al. ................... | 370/229 |
| 6,108,336 | * 8/2000 | Duault et al. ........................ | 370/395 |

* cited by examiner

Primary Examiner—Ricky Ngo
(74) Attorney, Agent, or Firm—Cesari and McKenna, LLP

(57) ABSTRACT

A method and system for optimizing transmission links bandwidth utilization in an Asynchronous Transfer Mode (ATM) packet switching network including switching nodes interconnected by high speed transmission links, said network being made to transport user data traffic including PTM traffic organized into variable length packets, each packet comprising a variable length data payload and an original fixed length PTM packet header. The original PTM header is converted into an ATM-like header including a flag (F) identifying the packet as being a PTM packet, a label indication made to orient the currently-considered PTM packet within the ATM network nodes, a count (CNT) field for storing the PTM payload length indication therein to enable locating the PTM payload end position and a Header Error Control (HEC) field for storing an ATM-like error control byte (HEC) therein, which enables transporting the PTM packets over the ATM network links without having to chop the PTM payload into predefined fixed length segments by adding dummy bits to the last segment if required.

13 Claims, 9 Drawing Sheets

METHOD AND SYSTEM FOR OPTIMIZING TRANSMISSION LINK BANDWIDTH OCCUPATION IN HIGH SPEED DIGITAL NETWORKS

FIELD OF THE INVENTION

The present invention relates to a method for optimizing link bandwidth utilization in a high speed digital network and to a system for implementing the method. The invention applies more particularly to optimizing voice traffic bandwidth utilization in an Asynchronous Transfer Mode (ATM) network.

BACKGROUND OF THE INVENTION

Modem digital networks are made to operate in a multimedia environment for transporting different types of data including pure data, i.e. files of alphanumeric characters, as well as data representing digitized and encoded voice, image, video signals etc. . . The network should, naturally ensure compliance with a number of requirements specific to each kind of such data traffic.

Different techniques have been developed for transporting data from one location to another, such as packet switching techniques where the data is arranged into packets. Those packets may either be a predefined fixed length, like in Asynchronous Transfer Mode (ATM), or be variable in length, like in a Packet Type Multiplexing (PTM) mode of operation currently used for transporting voice. The basic aim of both packet switching techniques, is to allow a statistical multiplexing of the different types of data onto transmission links to optimize, as much as possible, use of the available transmission bandwidth. Consequently, a large number of networks, both public and private, have been developed for transporting those data throughout the world.

On the other hand, the evolution of telecommunication technologies in general, and of packet switching networks in particular, is driven by many factors among which the technology evolution factor and the application factors are worth being emphasized.

As far as technologies are concerned, obviously considerable progress has been achieved recently with the maturing of new transmission media. High speed rates can now be sustained with very low error rates. High bandwidth can be turned into profit for long distance networks as well as for high rate local networks. Universal use of digital technologies appeared within both private and public telecommunication networks.

Due at least in part to the availability of these emerging technologies, many potential applications that were not possible in the past are now becoming accessible and attractive. In this environment, generic requirements are now expressed by the users, such as:

Improving old applications. Sub-second response times, which are achievable on low cost personal computers, have raised user expectations so that the lengthy wide area networks response times that were acceptable some years ago are today no longer tolerable. The user interface can be improved, for example, with fast response full screen applications.

Enabling new applications. Emerging applications like graphic, image, video and multimedia processing are generating large volumes of traffic. These new applications, not considered feasible (or even thinkable) not too long ago, are now available and are generating an ever-increasing demand on bandwidth.

Optimizing communication networks. There is a need for rationalizing the many disparate networks that major users have already implemented. Investments can be optimized by integrating heterogeneous traffic like voice, video, and data over the same transport facilities regardless of protocols. On the other hand, users want the opportunity to control their networking cost by choosing among the different price/performance options offered by the variety of vendors and carriers and to maximize their ability to take advantage of applications built on top of disparate underlying network technologies.

Accordingly, there has been an explosion in demand for high speed digital network facilities which is leading service providers to install core backbone networks to offer high speed data transportation facilities to large numbers of heterogeneous users' traffic, possibly through "access backbones". Bandwidth offered through such service providers should be transparent to users and should offer fairly large communication bandwidth at optimal cost.

Service providers are now running or expect to run large ATM core backbone systems for use by users needing to transport data traffic between distant locations throughout the world. Utilization of ATM core backbone systems makes particularly sense when the users traffic is multimedia in nature.

ATM networks are made to transport fixed length data packets, i.e,. 53 byte long packets having 5 bytes for a packet header and 48 bytes reserved to a data payload. Different techniques have been developed to convert variable length packets (PTM) into ATM-like fixed length packets that can then be transported throught the ATM core backbone. These techniques broadly include chopping the PTM packets into fixed length segments, assigning each segment a 5 byte long ATM-like header which enables forwarding the resulting fixed length packets into the ATM core network. Since most PTM variable length packets will not be a multiple of preassigned conventional length, the last constructed ATM packet from each PTM packet will typically have less than 48 bytes of data payload and will need padding bits. The padding bits carry no information and are considered overhead, which increases the bandwidth needed for a user's traffic.

For pure data providing fairly long and controllable packets, the added overhead is a relatively small portion of the overall traffic and thus may be ignored. This is far from being the case for multimedia traffic and more particularly for voice traffic generating randomly distributed relatively short PTM packets. For this kind of traffic, a method for transporting PTM originating data over an ATM network while minimizing overhead may result in significant savings for a customer leasing bandwidth in a service provider network.

Any method which minimizes the creation of overhead can be expected to be welcomed by both the ATM core backbone owner in a competitive service provider environment and by the user leasing bandwidth from such backbone owner.

The present invention focuses on solving the overhead problem created when padding bits are generated during the conversion of variable length data packets into fixed length ATM packets (or cells).

SUMMARY OF THE INVENTION

This invention can be implemented as a method and system for optimizing transmission links bandwidth utilization in an Asynchronous Transfer Mode (ATM) packet switching network including switching nodes interconnected by high speed transmission links. The network is one to be used to transport user data traffic including traffic originally existing as PTM traffic organized as variable length packets. Each such PTM packet has a variable length data payload and a fixed length PTM packet header. The original PTM header is converted into an ATM-like header including a flag (F) identifying the packet as being a PTM packet, a label indication made to orient the current PTM packet within the ATM network nodes, a count (CNT) field for storing the PTM payload length indication therein to enable locating the PTM payload end position and a Header Error Control (HEC) field for storing an ATM-like error control byte (HEC) therein. The converted header is attached to the payload to obtain a PTM frame to be transmitted over the ATM network links.

Objects and characteristics of the invention will become more apparent from the following detailed description of a preferred embodiment of the invention when considered with reference to the accompanying figures.

DESCRIPTION OF THE PREFERRED
EMBODIMENT OF THE INVENTION

Figure 1:
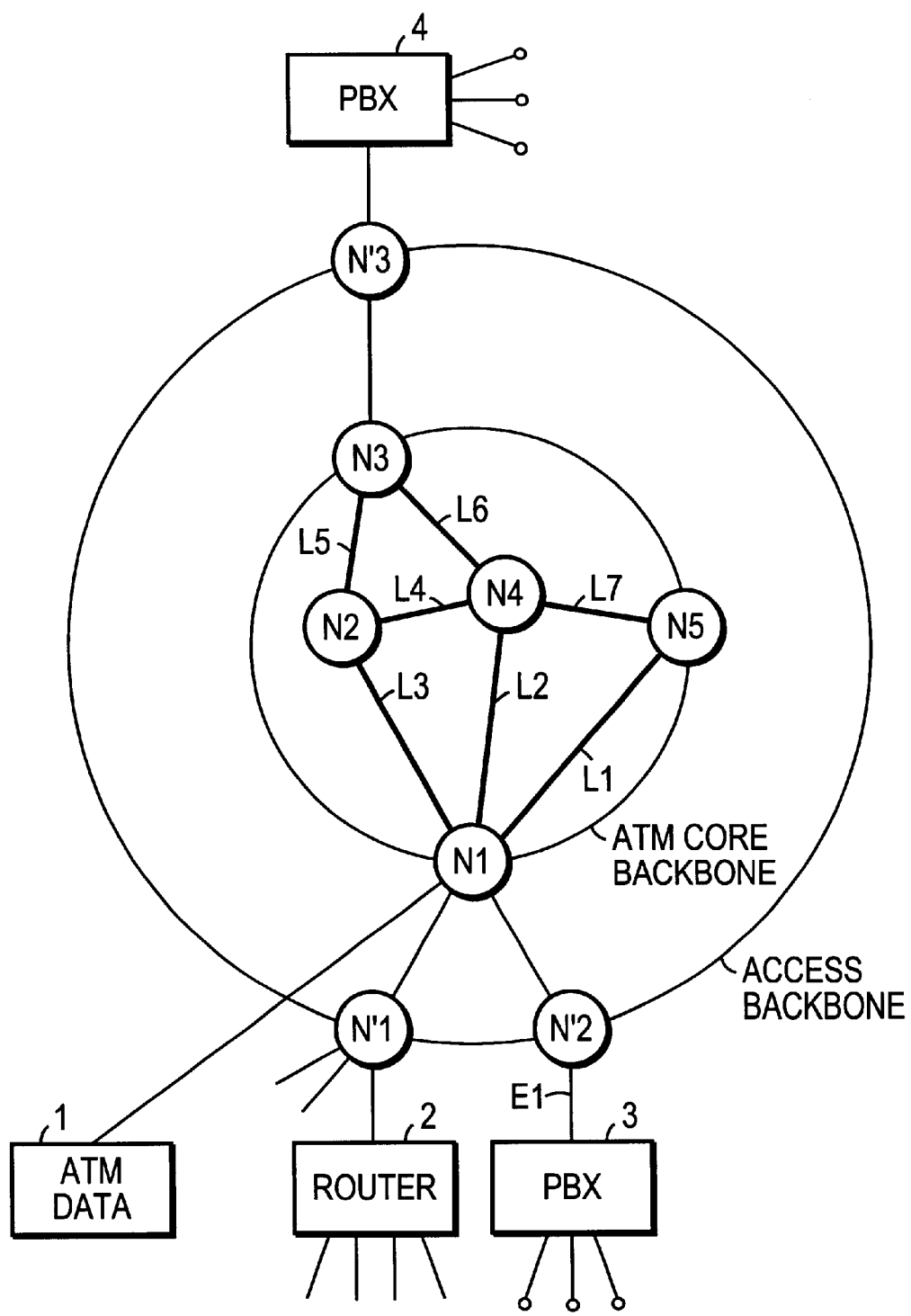
FIG. 1 represents a large data communication network including an ATM core backbone in which the invention is to be implemented.

Represented in FIG. 1 is a service provider's network (an ATM core backbone) including five nodes labeled N1,N2, N3,N4 and N5 interconnected by high speed links L1 through L7, which might be OC3/STM1 type of links. This network may be used to interconnect users directly or via an access backbone system. For instance, an ATM data source (1) may be connected to the ATM core backbone directly through node NI while a router (2) and PBXs (3) and (4) providing PTM type of traffic may be connected to the ATM core backbone indirectly through access backbone nodes N'1, N'2 and N'3 respectively. Obviously, nodes N'1, N'2 and N'3 should provide facilities for converting from PTM to ATM modes and vice-versa.

As already mentioned, an ATM packet includes a 48 byte long data payload attached to a five byte long header. The header concatenates a 1 byte long Header Error Control (HEC) field to a 4-byte long field mainly devoted to storing Virtual Path/Virtual Channel identifications (VP/VC) parameters used in switching the packet through the ATM network, but including few bits (e.g. 4 bits) for storing Generic Flow Control (GFC) data. The Header Error Control (HEC) byte covers the entire ATM packet header and is used, in operation, for either single bit error correction or for multiple bit error detection.

Briefly stated, the HEC field value is calculated and recorded in the header when the packet enters the network. The HEC field value recorded in the packet is cross-checked at a point of exit from the network with a locally recomputed HEC based on the information carried in the packet header. The notation used to describe the error control is based on the property of cyclic codes. The elements of an n-element code word are the coefficients of a polynomial of order (n−1). These coefficients can have the value zero or one. The polynomial representing the content of a header (excluding the HEC field) is generated using the first header bit as the coefficient of the highest order term. The HEC field content is an 8 bit sequence representing the remainder of the division (modulo 2), by a predefined generator polynomial, of the product $x^8$ multiplied by the content of the header excluding the HEC field. The generator polynomial is defined in International Telecommunication Union (ITU-T) Recommendation I.432 as being $x^8+x^2+x+1$. At the transmitter side, the initial content of a register of the device computing the remainder of the division, is preset to all zeros and is then modified by division of the header, excluding the HEC field, by the generator polynomial and the resulting remainder is transmitted as the 8-bits long HEC. Again validity checking may be performed along the data path within the network by cross-checking the HEC received in the packet header with an HEC locally computed using the received header data.

The header contents, and more particularly the VPI/VCI fields, are changed in each traversed node within the ATM network. To speed up the transfer process within a node, some node architectures include connection tables addressed by the incoming packet's VPI/VCI field content. The connection tables provide the full outgoing packet header, including not only the new VPI/VCI information but also the precomputed HEC. The validity checking may then be performed at the final receiving connection end. For more details, one may refer to the European Patent Application, Publication Number 0000719065, with title "Multipurpose Packet Switching Node for Data Communication Network".

Figure 2:
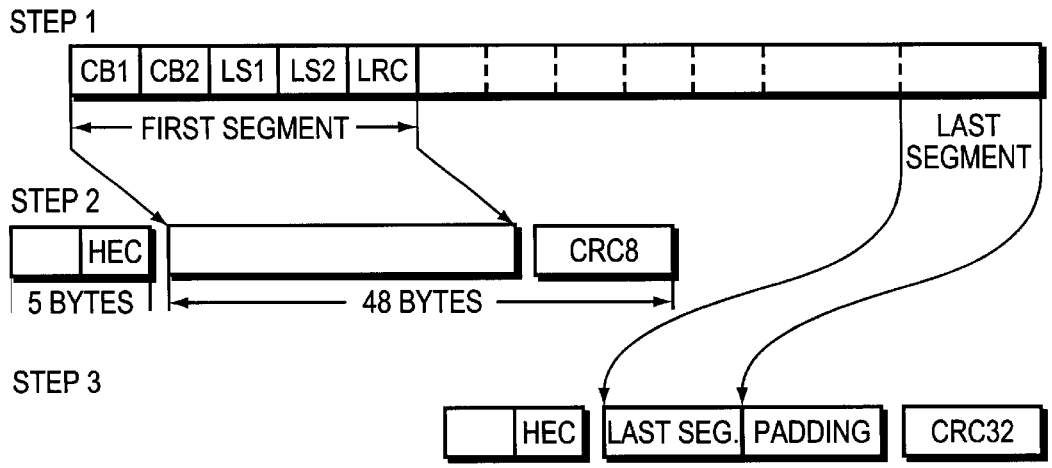
FIG. 2 illustrates a prior art method used to segment a PTM packet into fixed length ATM packets to enable transportation over an ATM network.

Referring to FIG. 2, the PTM packet represented there includes a variable length payload with an original fixed length header comprising two control bytes (CB1 and CB2), two label bytes (LS1 and LS2) assuming packet orientation within the network is performed through label swapping, a control byte for conventional Linear Redundancy Checking operations (LRC), and, a variable number of bytes for the user's data. Such a PTM packet may either be generated by a router (2) (see FIG. 1) or by a source PBX (3) processing essentially voice data. Transportation of the PTM traffic over the ATM core backbone is conventionally made possible by converting the variable length PTM packets into ATM-like cells/packets. The conversion may either be performed at an access backbone node (e.g. N'1) or at the ATM core backbone access node (e.g. N1). Conventional converting methods (e.g. see the above mentioned European Patent application) include splitting the variable length payload into fixed length segments (e.g. 47 bytes long). Then each segment is used to build an ATM-like cell. To that end, a cyclic redundancy code checking byte (CRC8) is generated for the given segment and appended to the segment; and an ATM-like header including a 1 byte HEC value is generated to encapsulate the segment (see FIG. 2, step 2).

The last segment (identified by a one bit field in the header) typically needs to be padded with dummy bits to achieve the required segment length (48 bytes long) once a 4 byte long CRC (i.e. CRC32) value covering the whole original packet payload and padding bits have been added.

Padding bits are a waste of network bandwidth. For fairly long and controllable data packets, as may be the case with pure data PTM packets provided by a router (2), the waste may be tolerable as it is a small fraction of the total data. For relatively-short, randomly-provided PTM packets (e.g. voice packets), the waste is typically less tolerable as the necessary padding bits can be a greater fraction of the total data.

For instance, assume PBX (3) multiplexes up to thirty one voice channels (each providing four bytes representing 0.5 ms of voice data blocks) into a PTM frame. The user data payload for each frame may vary between 4 bytes and 124 bytes. Obviously, segmenting and converting such PTM packets into ATM packets, with inclusion of padding bits as mentioned above, leads to a serious waste in overall network bandwidth.

The present invention is a method and system for minimizing lost bandwidth and optimizing ATM network bandwidth utlization, particularly for voice traffic. The invention can be implemented for existing networks which, from business and engineering standpoints, is highly significant. The goals are achieved by compressing and reshaping voice packets.

Figure 3:
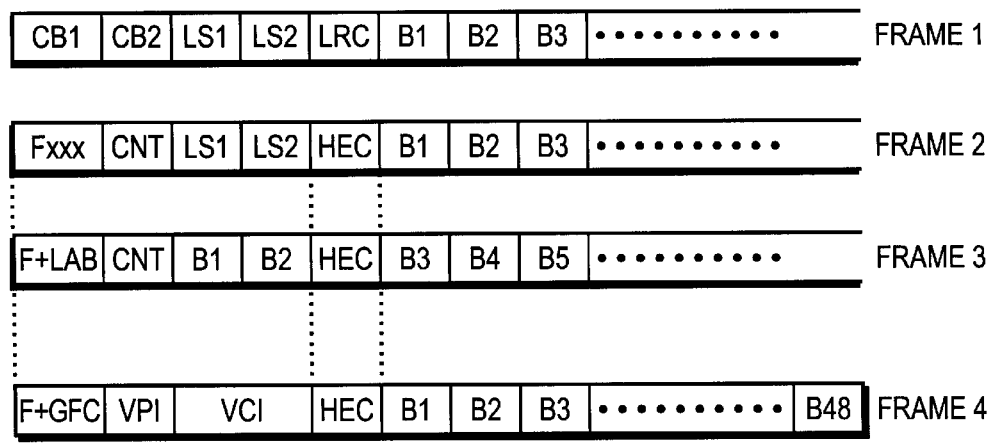
FIG. 3 illustrates the method of this invention for enabling transportation of both PTM and ATM packets over the same ATM network.

Referring to FIG. 3. A conventional PTM voice packet represented as frame (1) includes the two control bytes (CH1, CH2), the two label bytes (LS1, LS2), a one byte long checking field (LRC) and the user data bytes labeled H1, H2, H3, H4, etc.

A working assumption is the control bytes (CB1, CB2) are always the same for a given type of traffic. The control bytes may be dropped (or transferred into the payload) at the ATM entry node (e.g, node N1 in FIG. 1) and then reinserted at the network exit node (e.g. node N3 for a connection between PBX 3 and PBX 4). The two byte long field that becomes available can be used for a flag (F) identifying the packet as originating from PTM traffic and a count (CNT) indicating the length of the voice packet. The LRC is replaced by an HEC field (see frame 2 in FIG. 3).

Assuming the most significant bit of the Generic Flow Control (GFC) field in an ATM cell is used in this invention as a one bit flag (F) (see frame 4), then, both headers of PTM and ATM packet frames match perfectly as far as flag F and header HEC locations within the respective frames are concerned. In this invention, an ATM packet is discriminated from a PTM packet by the flag value. F=0 designates an ATM packet while F=1 designates a PTM packet. The count (CNT) field is used to locate a PTM packet end while an ATM packet end is always 48 bytes after the header HEC. In operation, one may assume that these PTM header "compression" operations are performed in an access backbone node (e.g. N'2), or in a port (e.g. N1) to the ATM backbone network.

A further compression of a PTM (e.g. voice) packet is represented in frame 3 in FIG. 3, which is used in the preferred mode of implementation of this invention. The 2 byte long label (LS1/LS2) is compressed into a seven bit long label LAB which can identify up to 128 connections. Then the first byte may represent the flag (F) and the label (LAB); the second byte is used for CNT and the fifth byte field is reserved for HEC. The third and fourth byte fields are the freed for data. Obviously, one may choose a label of a different length to identify a different number of connections.

Figure 4:
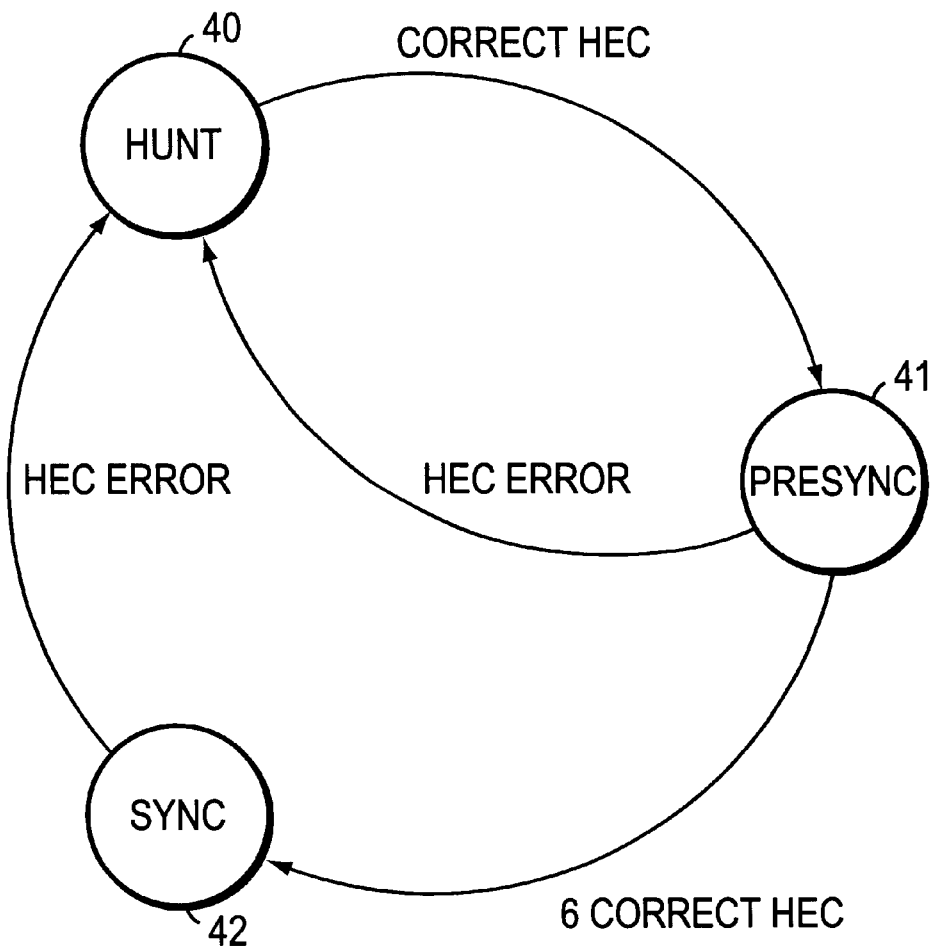
FIGS. 4 through 6 illustrate a state machine for the inventive method.

Then during operation, the PTM packet delineation state diagram shall match to the cell delineation state diagram as defined in the ITU-T Recommendations 1.432, but for the CNT function meant to localize a packet ending. Such a state diagram is represented in FIG. 4. Packet delineation is performed by using the correlation between the header bits to be protected (4*8=32 bits) and the relevant control bits (8 bits) introduced in the header by the HEC using a shortened cyclic code with the generating polynomial $(x^8+x^2+x+1)$. The state diagram loops into three states designated as "Hunt", "Presynch", and "Synch". In the "Hunt" state (40), the delineation process is performed by checking bit by bit, within the header bits, for the correct HEC. In other words, the HEC is computed sequentially on the incoming bits, starting with the flag F and up to the last bit of fourth received byte, and the system checks for matching with the fifth received byte (i.e. HEC). Once agreement is found (correct HEC) the method enters into "Presynch" state (41) for confirmation by checking packet by packet for the correct HEC over a predefined number of packets. The only difference between ATM and compressed PTM will then lie in the fact that next ATM cell/packet end is at 48 bytes distance from HEC, while PTM packet end shall depend on the count indicated by the CNT field content. Both packet/cell end tracking are triggered and differentiated by the flag F value. If an incorrect HEC (HEC error) is found, the process returns to the "Hunt" state (40). Otherwise it enters into "Synch" state (42). This first predefined number of consecutive correct HECs has been selected to be equal to six in the preferred embodiment of this invention as suggested by the ITU-T Recommendations 1.432. In the "Synch" state the packet delineation will be assumed to be lost (HEC error) if an incorrect HEC is obtained a second predefined number of times consecutively.

Figure 5:
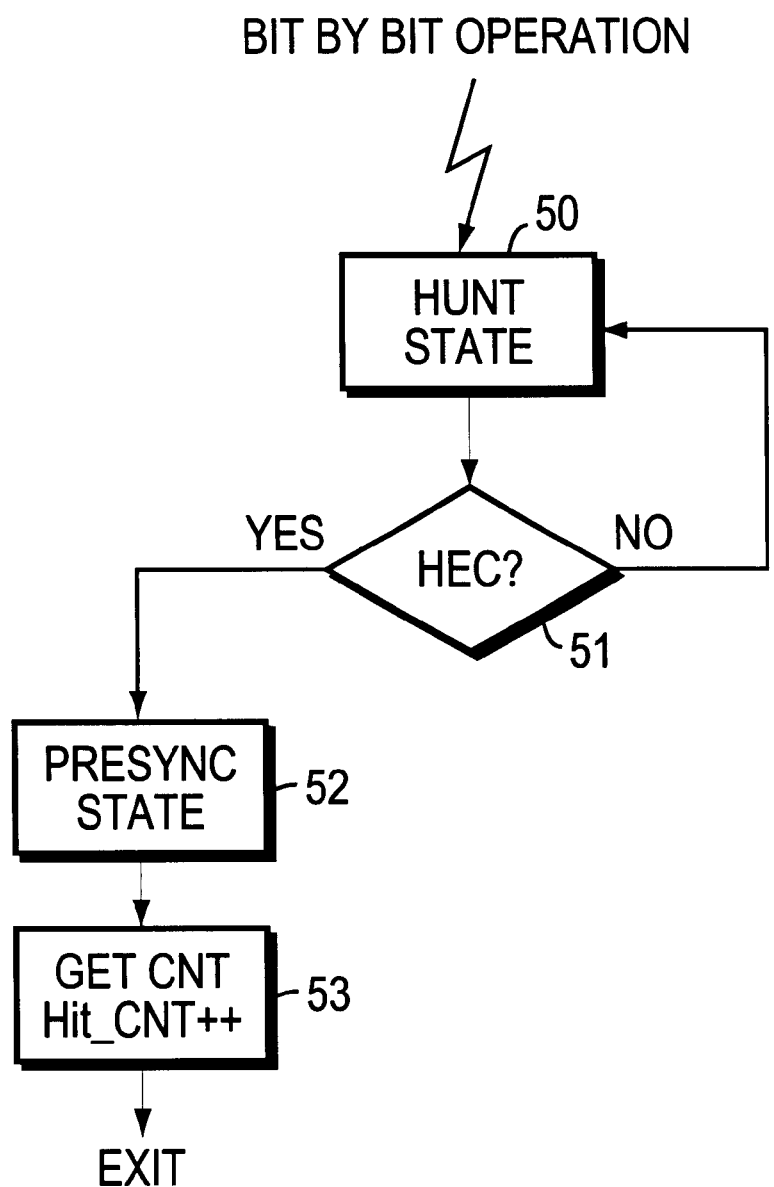

FIG. 5 shows an algorithm for implementing the "Hunt" state to search for synchronism assuming a PTM packet (F=1) is being processed. The received frame header bits are serially fed into Hunt operation (50) for HEC computation based on the above mentioned generator polynomial. Then, a test for checking with the received HEC field content is performed (51). In case of negative test, the process loops back to (50). Otherwise, "Presynch" state (52) is entered and the CNT count field content is looked for (53), with counter CNT which is being dynamically incremented.

Figure 6:
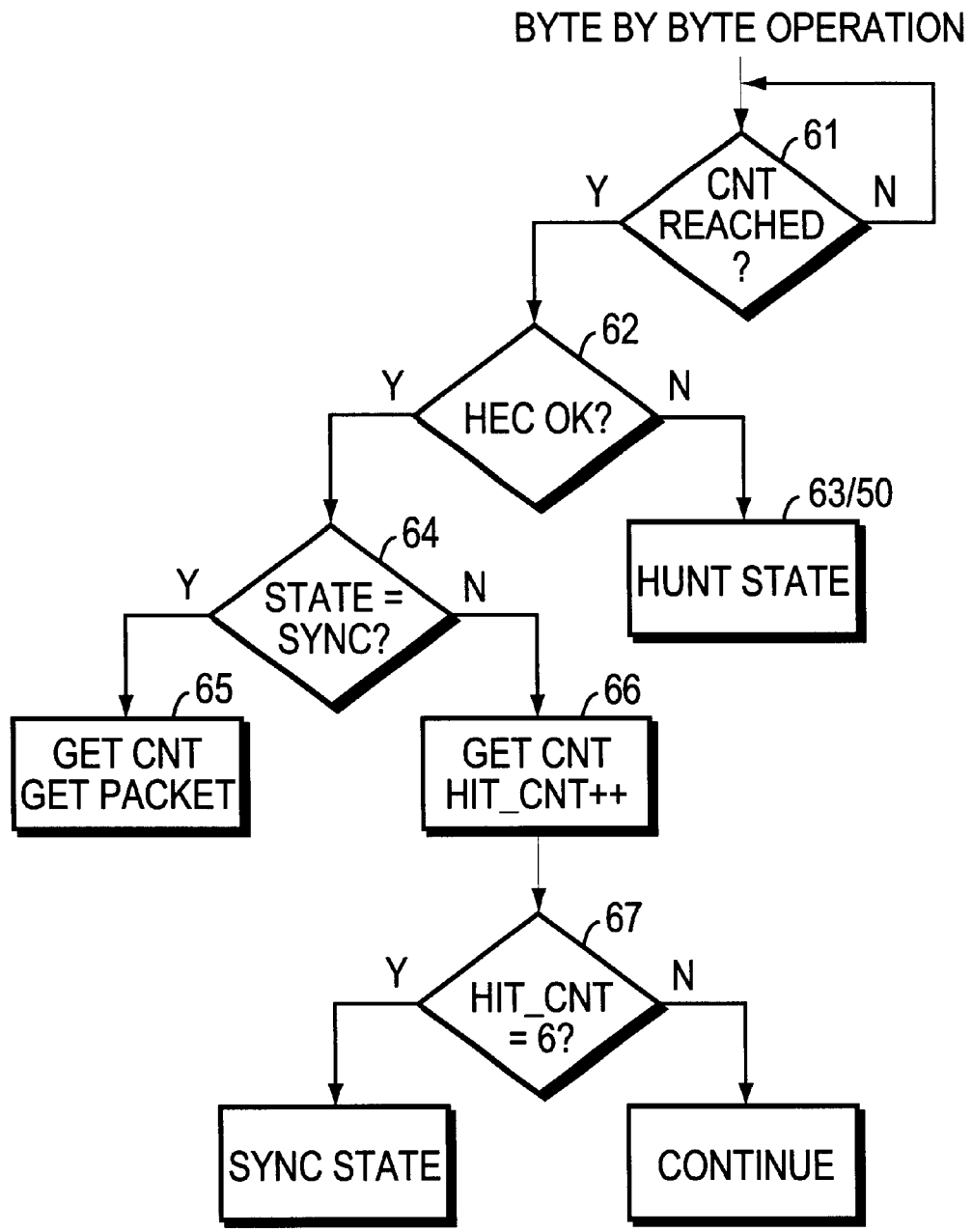

The system goes then to "Presynch" and "Synch" algorithms as represented in FIG. 6. A check on count field content, i.e. CNT, is first processed (61) and as long as the CNT value is not reached, count tracking continues on a byte by byte basis. Once the count is reached, the header is checked for validity (62). Should the tracked HEC be invalid, the process goes back to "Hunt" state (63/50), otherwise it branches to check for "Synch" state (64). In case of positive match, the process goes to step (65) to get the count (CNT) and get the packet accordingly. Otherwise, should the result of test (64) be negative, the process goes to get the count (CNT) and increase Hit Count (66) and check for six Hit_Counts (67). As long as six hit counts are not reached, the process continues until six hit_counts to declare "Synch" state.

As already mentioned, the invention is particularly attractive because it may apply to ATM core backbones or networks already available in the field. It is implementable into available network node architectures without a need for redesign of either node hardware or software. It may be implemented as a Line Interface Card to be attached to any link connected to a preexisting node to be operated in hybrid mode (both ATM and PTM traffic).

Figure 7:
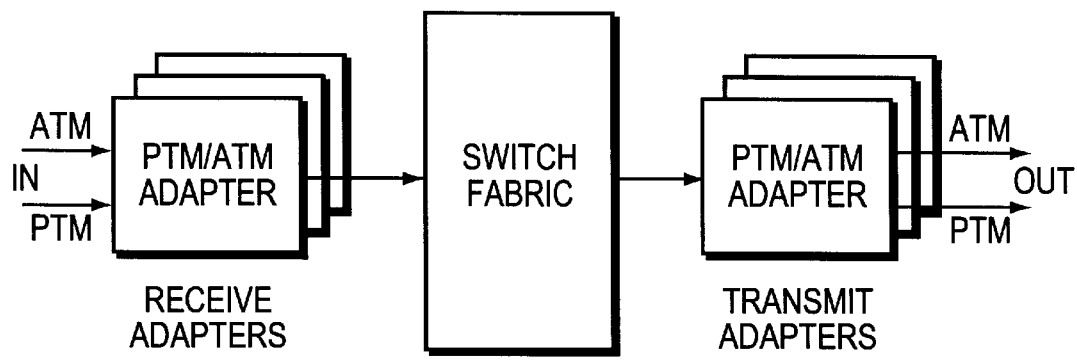
FIG. 7 shows a block diagram of a conventional ATM network node.

A conventional node architecture is schematically represented in FIG. 7. The network node is connected to both ATM and PTM trunks through a set of receive adapters on receive side and a set of transmit adapters on the transmit side. Both sets of adapters are interconnected through an ATM Switch fabric which processes ATM shaped packets/cells only. Since the Switch is made to operate on ATM (fixed length) cells, variable length traffic (PTM) is segmented in the adapters into ATM cells for switching purposes, while the ATM traffic is switched almost directly. Both are however arranged into a format including, in addition to a conventional ATM-like packet (ATM header (5 bytes) plus payload (48 bytes)), the following information:

a. a switch routing header (SRH) to route the ATM cells through the switch fabric stages (e.g.: 3 bytes);

b. a control field (CNTL) for adapter-to-adapter protocol and switch microcontroller (e.g. 1 byte); and c. a CRC (e.g. : (1 byte) field appended to the payload data and made to protect the ATM cell, proper, between switch receive and transmit interfaces. core backbones or networks already available in the field. It is implementable into In operation, the receive adapter (e.g. on node port) receives PTM or ATM packets and performs a number of operations including: LRC or HEC checking, traffic discrimination and routing. The first function is meant to check integrity of the received packet header and in case of integrity mismatch, the packet is discarded.

As far as routing is concerned, routing from input (receive) adapter to output (transmit) adapter via the ATM Switch fabric, is essentially based on the label swapping in the packet header, each label designating a node output trunk to reach the next network node over a given path, through table look-up operations. For more information on this feature, one may refer to European Application, Publication number 0000706297, with title "Method for Operating Traffic Congestion Control in a Data Communication Network, and System for implementing said Method"; and the above mentioned European Application, Publication Number 0000719065.

Figure 8:
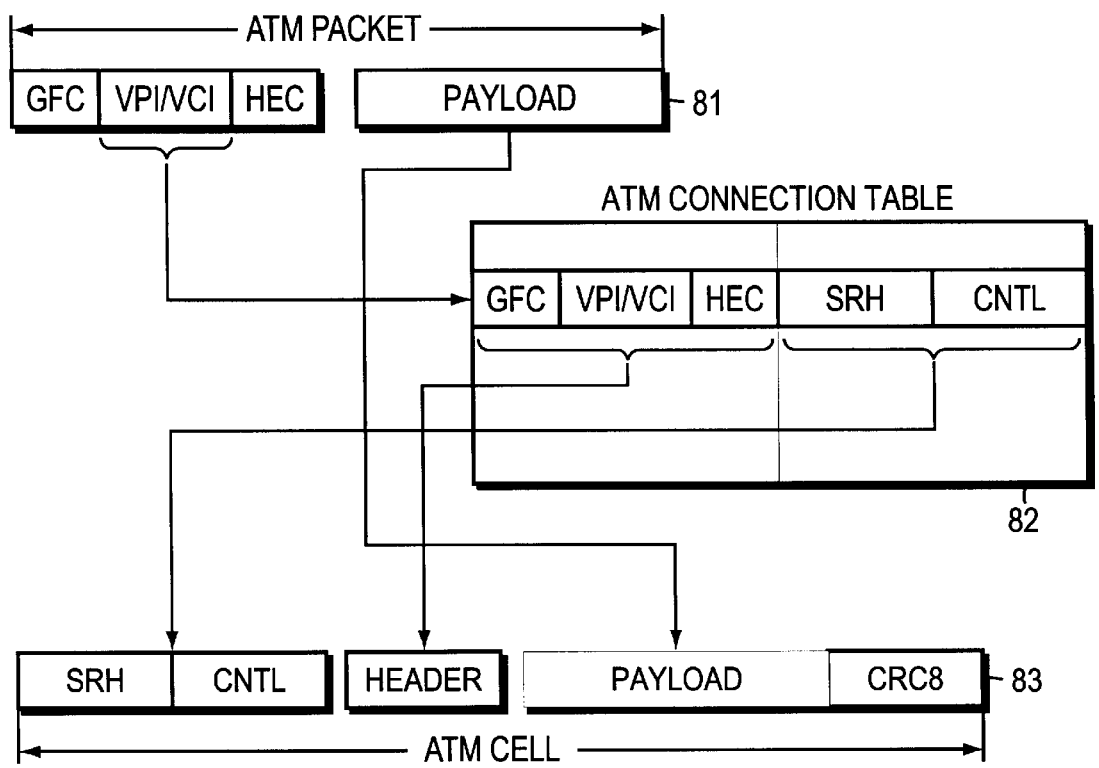
FIGS. 8 and 9 show conventional packet processing into an ATM network node for ATM and PTM packets, respectively.

The label swapping operation is summarized in FIG. 8. The VPI/VCI field content of a node entering ATM packet (81) is used to address an ATM Connection Table (82) which has been set in each node to store the information corresponding to the path assigned to the connections throughout the network defined, for instance, at connection set-up. The ATM connection Table addressing returns new values for VPI/VCI field (with the corresponding control (GFC) and HEC made accordingly). The table look-up operation also provides additional information made to enable routing the current packet throughout the switch (e.g. SRH) and associated control data (CNTL). This information, which "encapsulates" the packet header should be removed before transmitting the packet over a node output line. Also, a control byte (CRC8) is added for validity checking of the "ATM" cell (83) to be fed to the node Switch Fabric.

Figure 9:
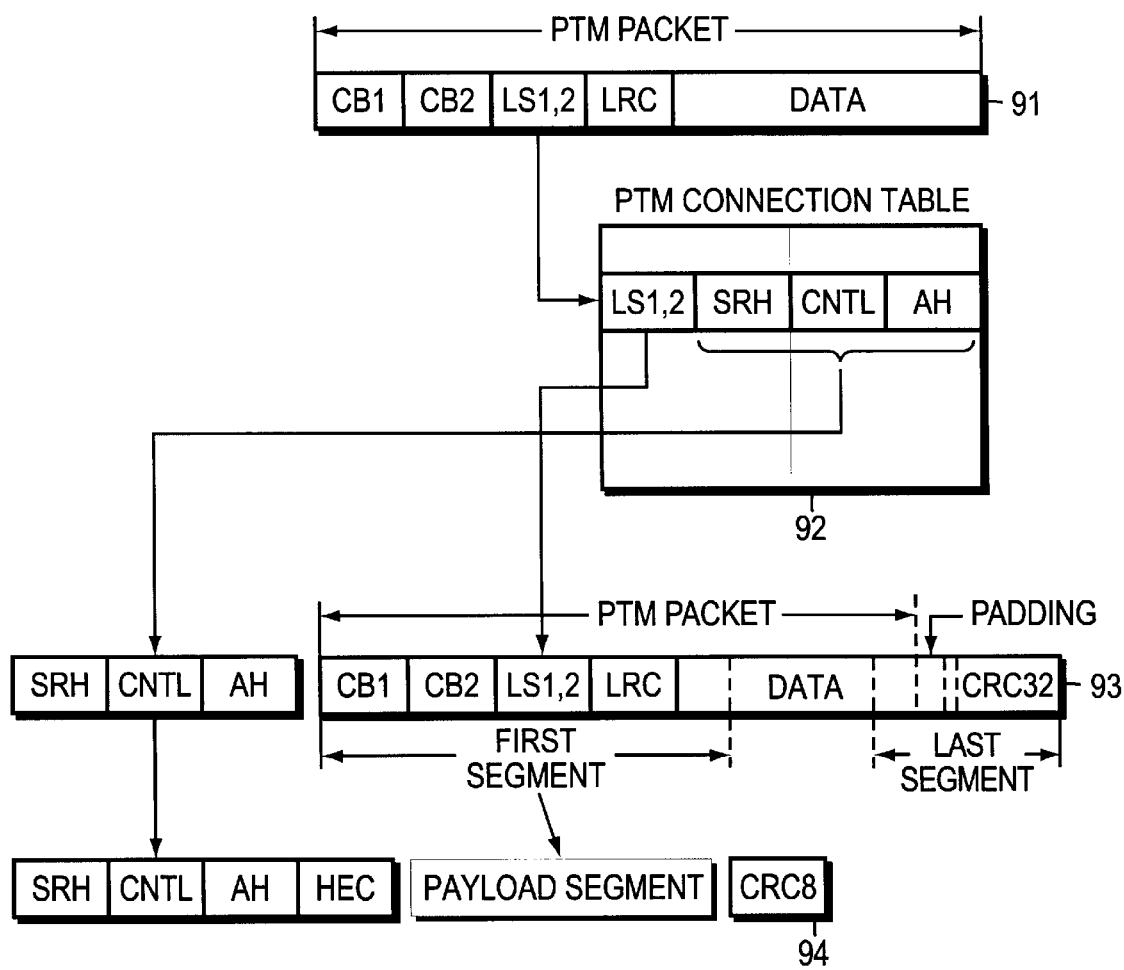

Prior art PTM packet processing and routing based on label swapping is represented in FIG. 9. In the network port, the original PTM packet label information (LS1,LS2) is used to point to a PTM connection Table (92) which provides a switch routing header including SRH and CNTL fields, together with an ATM-like header information AH. These three fields are made to encapsulate the original PTM packet (see 93). As mentioned with reference to FIG. 2, the PTM packet is segmented to enable constructing ATM-like cells/packets (94). But unfortunately padding bits might need being used to stuff the last segment to get again an ATM cell/packet whenever the resulting last segment is not long enough to fill-up the last ATM cell/packet.

To enable control of the traffic flow within the ATM core backbone network, a number of operations have to be performed at both node receive and transmit adapters. These include for instance, in a transmit adapter, first getting each cell from the Switch Fabric and checking its validity through its attached CRC8 and dispatching the cells based on whether they originated as ATM or PTM traffic (e.g. based on a preassigned bit in the control byte) and based on predefined virtual channel (VCI) information. See transmitter side in FIG. 10 wherein VCI 1 through 16 for instance have been assigned to PTM traffic originated and segmented in receive adapters 1 through 16, where these go to further processing on the right side of the adapter, while pure ATM goes to the left side. PTM originated cells are first reassembled according to the standard AAL5 layer, while the CRC32 is being computed to be checked. These reassembled packets as well as pure ATM packets are then routed (see 102 and 104). For instance, network control traffic may be simply addressed to an appropriate local node. Also, the routing includes stripping the encapsulation headers from both pure ATM and PTM originating cells. Finally, and to enable further transmission over the ATM network links, a new segmentation operation is needed to derive ATM-like cells from the reassembled PTM packet. This last operation (implemented using the conventional AAL5 procedure) means again stuffing the last segment with padding bits, which the present invention avoids to save network bandwidth, without having to modify the above described existing node adapter hardware and software.

To that end, a Line Interface Card (LIC) including a transmission portion (Xmit Adapt.LIC) and a receiving portion (Receive Adapt. LIC) have herein been added, can simply be attached to the existing transmit and receive adapters as just described.

Figure 10:
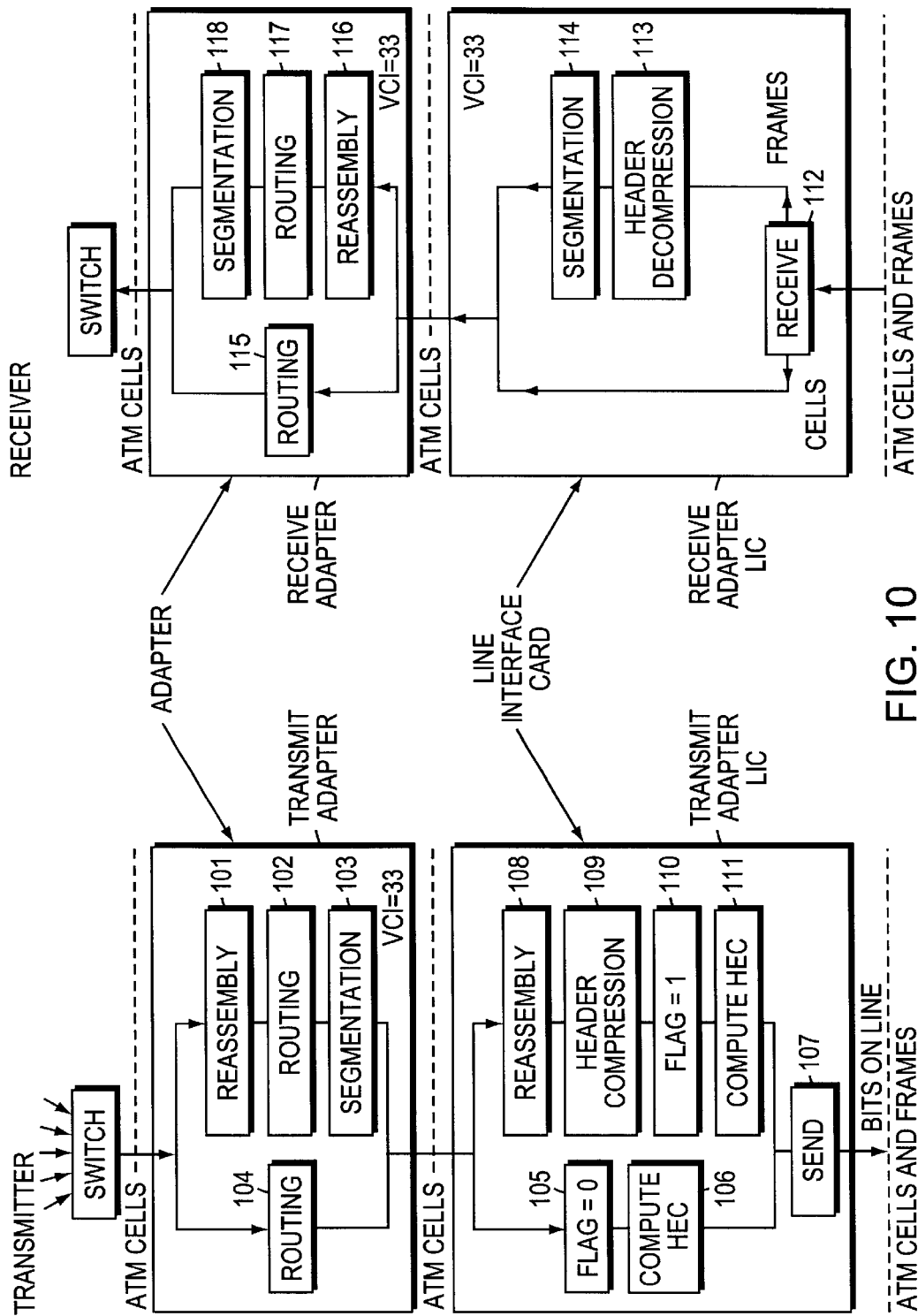
FIG. 10 is a block diagram illustrating the architecture of a preferred embodiment of the invention.

It is assumed herein that a specific virtual channel (e.g. VCI=33) was assigned by ATM core network management system to PTM traffic at connection set-up time. Then, as represented in FIG. 10 the transmit adapter LIC section can easily differentiate PTM traffic from ATM traffic based on the VCI identification. Whenever the VCI field content of a given cell/packet to be transmitted further over the network is different from 33 (pure ATM traffic), the traffic is oriented to the left. Then the flag F (see frame 4 in FIG. 3) is set to F=0 (105), the corresponding ATM cell header error control (HEC) is computed and loaded into the cell header field (106). Then the frame is sent (107) over the node output line. On the other hand, when the VCI field of the cell provided by the transmit adapter to the Xmit Adapt LIC, is set to 33, then the corresponding cell belongs to a PTM packet split into ATM-like cells through segmentations made according to the conventional ATM Adaptation Level 5 (AAL5) performed in (103). Then some operations are performed to get the compressed PTM packet according to the structures represented in FIG. 3 (see frame 2 or frame 3). Accordingly reassembling operations have first to be performed (108). During this operation, the cells are reassembled into their original packet, along with validity checking for the whole PTM packet through the CRC32 building-up from the cells belonging to the same PTM packet. Briefly stated, this means that, starting with the 48-byte long payload of first segment, CRC32 computation is started. It is stored as a partial CRC in a local memory control block addressed by a pointer derived from AH header. This partial CRC is then updated with all intermediate payloads of same PTM packet, down to the last, and then compared with the CRC32 stored in that last cell for validity check of the whole PTM packet processed.

Once the PTM packet has been properly reassembled and all padding bits, if any, have been removed therefrom using the information on AAL5 standard (108) header compression is performed in (109) according to this invention (see FIG. 3, frame 2 or frame 3), with the CNT field written to enable location of the PTM packet ending. The flag F is set to "1 " (in 110) to identify a compressed PTM packet. Finally, the Header Error Control byte is computed (111) and inserted into the assigned frame field. The frame is then forwarded to the line via the send device (107), which includes means for performing conventional queuing and thresholding after being stripped from encapsulation header (as required).

In the device (107) the packets (i.e. ATM cells and PTM frames) may be queued into several queues in case of multiple classes of traffic having been defined, e.g. based on priority criteria depending on the type of traffic involved. While thresholding operations may be performed to comply with each network user's reserved bandwidth. This criteria may be used to optimize the network operation bearing in mind that each user may apply for a predefined bandwidth depending on its expected traffic load.

On the node receive adapter side the Line Interface Card receive section (Receive Adapter LIC) is attached to interface between the transmission line entering the node and the conventional receive adapter. The receive adapter LIC includes a receive section (112). The receive section (112) fetches the bit stream received from the line and assembles the bits into either ATM cells or PTM frames based on the one bit flag F value. The receive section operations include therefore a synchro state machine as described above with reference to FIGS. 4 through 6 for properly assembling and validating PTM frames; or as described in the ITU-T Recommendation I.432 for operating on ATM cells/packets. While ATM cells go directly to the conventional receive adapter, the PTM frames are submitted first to header decompression operations (113) and then to segmentation operations (114). Header decompression is meant to enable recovery of the original PTM packet header, that is: checking then skipping the Header Error Correction byte, getting the control bytes CB1 and CB2 back, expanding the label as required, and then recomputing and reinserting the Line Redundancy Checking (LRC) byte.

To get the control bytes CB1 and CB2, the system may either fetch these back from the payload where they may have been inserted, or reconstruct these based on the type of traffic involved. For instance, as shown in FIG. 1 the PTM connection under consideration may be between PBX3 and PBX4, thus implying a specific type of traffic, e.g. voice connection traffic in which case the control bytes CB1 and CB2 are defined by International Standards. They then need no further analysis to be reconstructed.

As for the labels LS1 and LS2, these may either have been left unchanged as in frame 2 (see FIG. 3) or they may have been removed (see frame 3 in FIG. 3). In the latter case the labels could have been reinserted into the PTM frame payload during header compression, in which case they may now be fetched back therefrom, or they may have been converted into a compressed label (LAB). To understand the label compression, one may recall the label generation rationale. In a conventional ATM network, the connections between say PBX3 and PBX4 (see FIG. 1) are either established upon users' requests or under predefined circumstances (e.g. link failure recovery procedure). On both occasions, a connection path procedure is used to define the preferred path throughout the PTM network trunks and nodes, between the two PBX's. Then a connection set-up message is forwarded, by a network management device along said path, to reserve the selected path and enable fully defining each required node facilities. For instance, each network node may include a Trunk Connection Manager (TCM) which shall drive the operations performed to define the connections between node input and output channels. For instance, assuming the path under consideration runs into link 5 connecting node N2 to node N3 (see FIG. 1), then node N2 Trunk Connection Manager (TCM2) and node N3 Trunk Connection Manager (TCM3) are both involved in the process. In that case TCM3 drives the process and assigns the labels which are then stored into those nodes'PTM Connection Tables.

During a label compression operation, several assumptions may have been made. For instance, since in the preferred embodiment of this invention the required number of connections is limited, then the label allocations in, say, N3, is made in a known range (particularly true for voice connections). Assuming the least significant bits in the seven bit long LAB field are reserved to LS1, the others to LS2. Accordingly, in that case the compressed label LAB enables reconstruction of the original labels LS1 and LS2, each one byte long.

The original decompressed header components CB1, CB2, LS1 and LS2 are now available. A checking byte has to be computed. According to PTM traffic conventions, this checking byte is computed as a Length Redundancy Check (LRC) byte derived from a modulo 2 sum of the decompressed header components, CB1, CB2, LS1 and LS2. In fact, these may be simply XORed. This terminates header decompression operations (113), once the LRC has been inserted in the field freed by the above mentioned skipped HEC.

To recover the original PTM frame, all is that is needed is to reconstruct the original payload. The operations are obvious. If some payload bytes (see B1 and B2 in FIG. 3 frame 3) had been transferred into the compressed header, they are now transferred back to their original locations. On the other hand, if some of the original header bytes (e.g. CB1, CB2, LS1 ,LS2) were transferred into the payload, they shall have been transferred back during the header decompression operations (113). Finally the original frame 1 (see FIG. 3) is obtained. However, to enable attachment of the Receive Adapter LIC to the existing ATM node architecture, the Receive Adapter LIC must provide ATM-like cells coherent with ATM packets/cells received on the Receive Adapter LIC as provided by pure ATM traffic. Accordingly, segmentation operations shall be performed in (114), with padding bits if required. These operations are performed according to the AAL5 standard process as already described.

According to the above-mentioned criteria chosen for the preferred embodiment of this invention, the ATM-like cells derived from PTM traffic after segmentation in (114) are buffered and assigned the Virtual Channel (VCI) 33. Therefore, discrimination performed in the Receive Adapter Section of the Node between ATM cells derived from ATM traffic and cells derived from PTM traffic is based on VCI value, with those bearing a VCI different from 33 being oriented toward Routing (115). Naturally, it should be understood that prior to any such dispatching, cell validity may have been checked based on CRC8 (see FIG. 9). CRC validity checking is not represented in FIG. 10.

As for the ATM cells transported over VCI=33, such cells are submitted to AAL5 reassembly operations while the validity is being checked for the PTM packet being reassembled, via CRC32 checking. This again means, for each PTM packet to be reconstructed, starting with the 48-byte long payload of the first segment/cell provided (114), starting a new CRC32 computation, storing the computation result, as a partial CRC, in a local memory control block. This partial CRC is then updated with all next intermediate payloads belonging to same PTM packet, down to the last (identified properly), and then compared with the CRC32 stored in the assigned field of last segment, for PTM packet validity checking (116).

Once reassembled, the packets are properly routed (117). For instance, control traffic may be directed to the current node and be processed accordingly. As for other PTM origin traffic (e.g. voice traffic), once reassembled and routed, it is again segmented in (118) (e.g. AAL5 segmentation) and processed as disclosed with reference to FIG. 9, which means for instance encapsulation with ATM header, HEC insertion, as well as CRC32 generation/update (due to padding bits).

Finally, for each ATM cell being generated, be it from pure ATM, via routing (115) or deriving from segmentation in (118), a cell CRC8 is generated (not shown in FIG. 10) and reinserted as required.

The above is a simplified version of the Receive Adapter which might also include several improvements like, for instance, a backpressure mechanism to enable further regulating the traffic. In conclusion, those skilled in the art of digital communication network will appreciate the advantages of the proposed method for optimizing link bandwidth utilization by PTM traffic, e.g. voice traffic. The invention is fairly simple to implement and is transparent to existing networks. No modification of hardware or software of existing networks are required since a fairly simple Line Interface Adapter can be installed in existing network node adapters.

The gain in bandwidth obtained when using this invention, may be on the order of 20%. Assume, as previously mentioned, an existing conventional network with E1 connections multiplexing 31 voice circuits each being assigned 0.5 ms blocks (i.e. 4 bytes). Then a conventional PTM packet will have 4*31=124 bytes, plus 6 bytes for header and trailer, which makes 130 byte long packets. The AAL5 segmentation operations breaks these into 3 cells. With cell overhead needed to get ATM-like cells, each E1 connection requires (3*(48+5)*8)/0.5=2544 Kbps. Also assuming an OC3/STM1 link, with a 149768 Kbps bandwidth, and assuming the network operating between 85% and 96% bandwidth reservation, then the number of E1 connections per OC3/STM1 would be between (0.85*149768)/2544=50 and (0.96*149768)/2544=56.

When using the invention, the voice packet will be 3+4*31=127 bytes long (assuming the header includes, in addition to the payload, HEC, CNT and (F+LAB), each one byte long). The required bandwidth is now (8*127)/0.5=2032 Kbps. The number of E1 per OC3/STM1, with same bandwidth reservation assumptions as above, becomes between (0.85*149768)/2032=62%, and (0.96*149768)/2032=70%. In other words, the invention leads to an improvement in link bandwidth utilization between 24% and 28%, which given the bandwidth price rates currently practiced means thousands of dollars per 100 km and per month being saved.

While there has been described what is considered to be a preferred embodiment of the invention, variations and modifications therein will occur to those skilled in the art once they are made aware of the basic inventive concepts. Therefore, it is intended that the appended claims shall be construed to include both the preferred embodiment and all variations and modifications that fall within the true spirit and scope of the invention.

What is claimed is:

1. A method for optimizing transmission links bandwidth utilization in an Asynchronous Transfer Mode (ATM) packet switching network including switching nodes interconnected by high speed transmission links, said network being made to transport users' data traffics including so called PTM traffic organized into variable length packets each packet comprising a variable length data payload and an original fixed length PTM packet header, said method being characterized in that it includes converting said original PTM header into an ATM-like header including a flag (F) identifying the packet as being a PTM packet, a label indication made to orient the PTM packet within the ATM network, a count (CNT) field for storing a PTM payload length indication therein to enable locating a PTM payload end position and a Header Error Control (HEC) field for storing an ATM-like error control byte (HEC) therein, attaching said converted header to the payload to derive a PTM frame to be transmitted over the ATM network.

2. A method for optimizing transmission links bandwidth utilization in an Asynchronous Transfer Mode (ATM) packet switching network made to transport both ATM and PTM traffics, according to claim 1, and wherein said flag and said HEC locations in said converted PTM packet header are selected to respectively match with the flag and HEC locations within an original ATM packet header.

3. A method for optimizing transmission links bandwidth utilization in an Asynchronous Transfer Mode (ATM) packet switching network according to claim 2 wherein said original PTM header includes a two bytes long control block (CB1, CB2) field characterizing the type of PTM traffic to be transported over the ATM network, a two bytes long label field for storing therein labels (LS1, LS2) made to orient the considered PTM packet within the ATM network nodes, and a one byte long field for storing a header checking byte (LRC) therein, said method including compressing the original PTM packet header by:

removing said control blocks (CB1, CB2) and using the first byte field to store said flag (F) therein, and the second byte field to store said count (CNT) to define said PTM packet payload length therein; and, using said fifth byte (LRC) location to store said ATM-like HEC therein, whereby PTM frames are generated, the processing of which in a network node receiving section matches with the state machine operation as defined in the ITU Standard for ATM packet processing, but for the packet end position being defined by the count (CNT) field content.

4. A method for optimizing transmission links bandwidth utilization in an Asynchronous Transfer Mode (ATM) packet switching network according to claim 3, further including replacing said labels (LS1, LS2) by a compressed label (LAB) enabling identifying a predefined number of network connections defining the network paths assigned to PTM type of traffic within the ATM network.

5. A method for optimizing transmission links bandwidth utilization in an Asynchronous Transfer Mode (ATM) packet switching network according to claims 3 or 4 wherein said PTM traffic includes voice traffic to be transferred between users via the ATM network.

6. A system for optimizing transmission links bandwidth utilization in an Asynchronous Transfer Mode (ATM) packet switching network including switching nodes interconnected by high speed transmission links, said ATM network being made to transport both fixed length ATM packets and variable length PTM packets, both converted into fixed length ATM cells for transit between the network nodes, which nodes include a system having transmit and receive node adapters interconnected via a switching fabric, said system being characterized in that it includes a Line Interface Card (LIC) providing a Transmit (Xmit) Adapter LIC and a Receive Adapter LIC to be attached to said transmit and receive node adapters, respectively:

said Xmit Adapter LIC including reassembly logic (108), connected to said node transmit adapter, for reassembling PTM derived ATM cells into their original PTM packet/frame form, header compression logic (109, 110, 111) sensitive to said PTM packets provided by said reassembly (108) to perform header compression operations thereupon by converting the PTM header into a 5-byte long ATM-like header including a flag (F) set to identify the packet as being a PTM originating packet; measuring a PTM packet payload length and writing said length into a count (CNT) header field; computing a compressed header error control (HEC) byte and writing said HEC byte into the fifth byte of the 5-byte long ATM-like header, and transmission logic (107) for feeding compressed frames onto an attached transmission link; and said Receive Adapter LIC including frame reception logic (112) attached to the receive node adapter for deserializing a received bit stream and assembling it into said frames, packet generating logic (113) for converting said frames into their original packet form by decompressing said ATM-like header, and segmentation logic (114) for segmenting said original packets into ATM cells prior to delivering them into the corresponding node receive adapter.

7. A system for optimizing transmission links bandwidth utilization in an Asynchronous Transfer Mode (ATM) packet switching network, according to claim 6 wherein ATM network port operations for users'provided PTM packets are performed on said header compression logic (109).

8. A system for optimizing transmission links bandwidth utilization in an Asynchronous Transfer Mode (ATM) packet switching network, according to claim 7 wherein said header compression logic (109) includes logic for removing conventional PTM control blocks (CB1, CB2) defining the type of traffic from the PTM header and logic for writting them into preassigned locations in the PTM packet.

9. A system for optimizing transmission links bandwidth utilization in an Asynchronous Transfer Mode (ATM) packet switching network, according to claim 7 wherein said header compression logic (109) includes cell processing logic for stripping conventional PTM control blocks (CB1, CB2) from the PTM header and for writing the contents of the control blocks into preassigned locations in the PTM packet.

10. A system according to claim 8 or 9 further including logic for stripping label swapping indicators (LS1, LS2) from the PTM packet in its original form and replacing such indicators by a shorter label indicator (LAB) and then writing the LAB with the flag (F) into the same byte position.

11. A system according to claim 10, wherein said frame reception logic (112) includes:

a) assembly and error checking logic for sequentially assembling the bits received from the attached link and computing the header control byte (HEC) according to the method defined by the ITU Standard, over thirty two consecutive bits;

b) compare logic for checking whether said computed HEC matches with the fifth received byte; and, in case of a match, checking the first received bit (flag F) of said thirty two consecutive bits and, should the value of said flag bit identify the packet being received as a PTM packet/frame, then, looking for the CNT field content to identify the PTM payload end; and, c) control logic for repeating steps (a) and (b), starting with the first received bit following said identified payload end, whereby a predefined number of consecutive repetitions of correct HEC checkings may be considered as validating the frames received by logic (112).

12. For use at an access node connected to an Asynchronous Transfer Mode (ATM) packet switching network including switching nodes interconnected by high speed transmission links, a method for converting variable length payloads within Packet Transfer Mode (PTM) packets received at the access node to a fixed length ATM-like packet suitable for transmission through the ATM packet switching network, said method comprising the steps of:

creating an ATM-like header including a flag (F) identifying the fixed length ATM-like packet as a PTM-origin packet, a label indication for orienting the ATM-like packet within the network, a count (CNT) field identifying the length of the variable length payload, and a header error correction (HEC) byte; and attaching the created ATM-like header to a payload to create a fixed length packet suitable for transmission through the ATM packet switching network.

13. A system for optimizing link bandwidth utilization in an Asynchronous Transfer Mode (ATM) packet switching network including switching nodes interconnected by high speed transmission links, said system including a transmit adapter for processing variable length (PTM) packets having headers and payload lengths to create fixed length cells suitable for transmission through the ATM packet switching network, said adapter including:

header compression logic (109, 110, 111) which converts the PTM header into a 5-byte ATM-like header including a flag (F) which can identify the fixed length cell as representing part of a PTM-origin packet; measures the PTM packet payload length and writes said length measurement into a count (CNT) header field; and computes header error control byte and writes said header error control (HEC) byte into an appropriate field in the ATM-like header;

packet generating logic for attaching the ATM-like header to a fixed length data payload to produce a fixed length cell; and transmission logic (107) for transmitting the fixed length cell onto an attached transmission link.

* * * * *